United States Patent
Vilsmeier

(10) Patent No.: US 7,168,725 B2
(45) Date of Patent: Jan. 30, 2007

(54) DISPLACEMENT BEARING AND MOTORCYCLE FORK HAVING SUCH A DISPLACEMENT BEARING

(75) Inventor: Gerd Vilsmeier, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/066,989

(22) Filed: Feb. 28, 2005

(65) Prior Publication Data

US 2005/0151342 A1 Jul. 14, 2005

Related U.S. Application Data

(63) Continuation of application No. PCT/EP03/08459, filed on Jul. 31, 2003.

(30) Foreign Application Priority Data

Aug. 29, 2002 (DE) .................. 103 39 618

(51) Int. Cl.
B62K 21/20 (2006.01)
F16C 31/04 (2006.01)
(52) U.S. Cl. .................. 280/279; 280/276; 384/25
(58) Field of Classification Search ............ 280/276, 280/279, 280, 283; 188/322.16, 322.19; 384/25
See application file for complete search history.

(56) References Cited

U.S. PATENT DOCUMENTS

| 2,156,580 | A |   | 7/1936 | Best |
| 4,433,875 | A | * | 2/1984 | Walter et al. .................. 384/49 |
| 4,875,543 | A |   | 10/1989 | Verkuylen |
| 5,044,648 | A | * | 9/1991 | Knapp ......................... 280/283 |
| 5,529,328 | A |   | 6/1996 | Chang et al. |
| 5,720,491 | A |   | 2/1998 | Harper |
| 6,017,047 | A | * | 1/2000 | Hoose ......................... 280/276 |
| 6,145,862 | A | * | 11/2000 | D'Aluisio et al. ........... 280/276 |
| 6,533,459 | B2 | * | 3/2003 | Podhajecki et al. ........... 384/57 |
| 6,948,401 | B2 | * | 9/2005 | Zernickel et al. ............. 74/493 |
| 2005/0127636 | A1 | * | 6/2005 | Czysz ......................... 280/276 |

FOREIGN PATENT DOCUMENTS

| DE | 73 216 | 1/1894 |
| DE | 39 36 567 C2 | 11/1989 |
| DE | 39 36 587 A1 | 11/1989 |
| DE | 94 06 223 U | 6/1994 |

(Continued)

Primary Examiner—Lesley D. Morris
Assistant Examiner—Daniel Yeagley
(74) Attorney, Agent, or Firm—Crowell & Moring LLP

(57) ABSTRACT

Displacement bearing, in particular for fork pipes of motorcycle forks, having an inside part which has raceways extending in the direction of fork displacement on its outside part, an outside part which extends around the inside part and is displaceable in relation to the inside part, at least two roller bodies which are arranged in the interior of the outside part and which are mounted so that each can rotate about a respective axis of rotation situated in the interior of the outside part, so that the roller bodies roll on the raceways when there is a displacement of the inside part in the outside part. The roller bodies have a convex shape and the raceways each have a concave shape for transferring forces acting perpendicularly and/or transversely on the raceways.

14 Claims, 3 Drawing Sheets

FOREIGN PATENT DOCUMENTS

| | | |
|---|---|---|
| DE | 199 57 984 A 1 | 12/1999 |
| FR | 12 49 781 A | 12/1960 |
| GB | 8 845 675 | 8/1960 |
| JP | 63030620 A * | 2/1988 |
| JP | 2000097232 A * | 4/2000 |
| WO | WO 01/29438 A1 | 4/2001 |

* cited by examiner

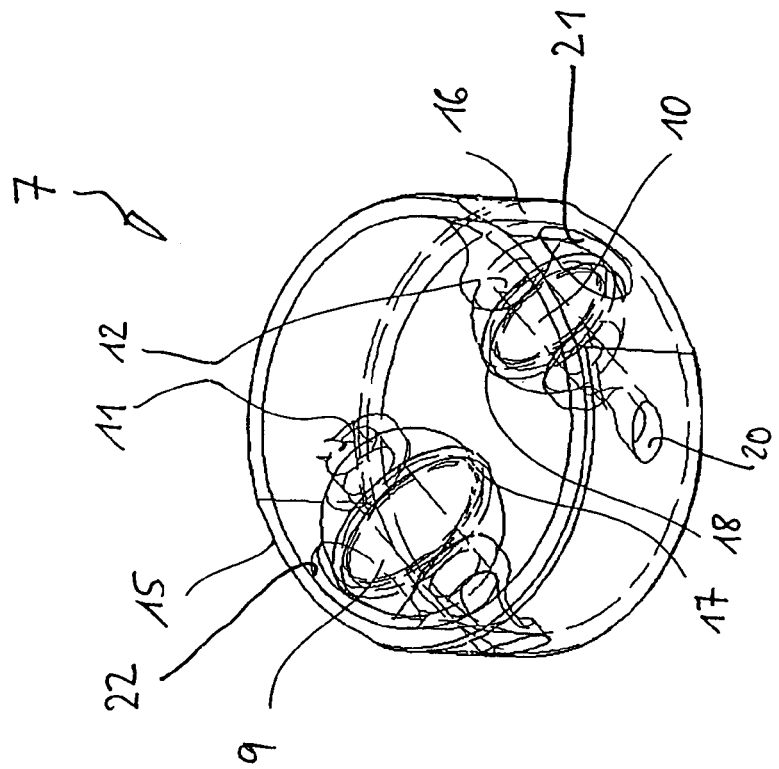
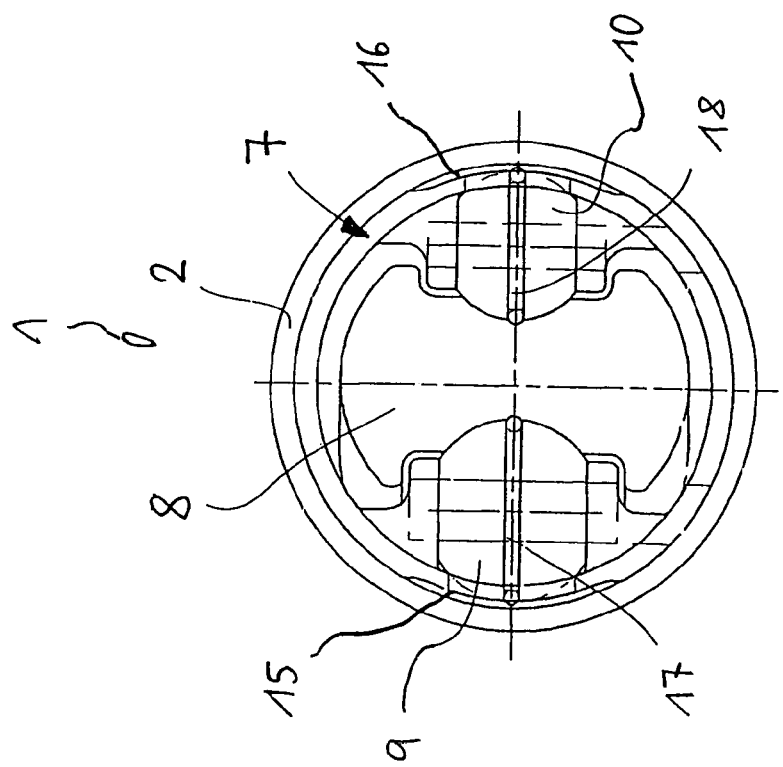

DISPLACEMENT BEARING AND MOTORCYCLE FORK HAVING SUCH A DISPLACEMENT BEARING

This application is a continuation of International Patent Application No. PCT/EP03/08459, filed Jul. 31, 2003, the entire disclosure of which is incorporated herein by reference. Priority is claimed based on German Patent Application No. 102 39 618.3, filed Aug. 29, 2002.

BACKGROUND AND SUMMARY OF THE INVENTION

This present invention relates to a displacement bearing with at least two rollerbodies guilding an inner part there between, and a motorcycle fork with the displacement bearing.

DE 199 57 964 A1 has disclosed a front wheel guide for a motorcycle. The motorcycle has a motorcycle fork with two forked pipes. Each forked pipe consists of a bottom part, which may be referred to as the "wheel carrier pipe" and on which the front wheel is mounted. The wheel carrier pipe forms an outside part of a displacement bearing. A banana-shaped inside part is inserted into the wheel carrier pipe, forming the lower section of an upper forked pipe element. The banana-shaped end piece of the upper forked pipe has one guide face on its front end and another on its rear end. Roller bearings which can roll on the guide surfaces are provided in the wheel carrier pipe. The banana-shaped end piece can be displaced in relation to the wheel carrier, with the roller bearings and/or roller bodies rolling on the guides. Details regarding the specific design of the guide faces and the roller bearings and/or roller bodies are not included in DE 199 57 964 A1.

The object of this invention is to improve upon the bearing described above so that it will be permanently without play.

This invention is based on a displacement bearing having an inside part and an outside part. The inside part has raceways on its inside extending in the direction of displacement. The outside part extends around the inside part and is displaceable in relation to the inside part. At least two roller bodies are provided in the interior of the outside part. The roller bodies are mounted to rotate about an axis of rotation arranged in the interior of the outside part. With a displacement of the inside part in relation to the outside part, the roller bodies roll on the raceways of the inside part.

The basic principle of this invention consists of using roller bodies having a convex shape and designing the raceways on which the roller bodies roll with a concave shape. Due to the convex shape of the roller bodies and the concave shape of the raceways, the displacement bearing can absorb compressive forces acting perpendicular to the raceway as well as lateral forces acting across the raceway. The roller bodies are in close contact with the raceways, which ensures a good distribution of forces and prevents material from flaking off.

According to one embodiment of this invention, the axes of rotation of the roller bodies—comparable to a chord of an arc of a circle—cover an arc-like segment of the wall of the outside part. The ends of the axes of rotation are attached to and/or mounted on the inside of the outside part.

The roller bodies may be designed to be spherical or ellipsoidal or with a cambered shaped in general. The roller bodies are preferably designed so they are flattened at the sides. In the case of spherical roller bodies, these are then "flattened" spheres, i.e., spherical bodies on which the dome-shaped sections on the sides are "missing."

The outside part is preferably a closed pipe, e.g., a cylindrical pipe and/or a bearing cage in the form of a cylinder. The outside part preferably has wall sections that are distributed over its circumference and differ in wall thickness. The rigidity of the outside part can be specified through the design with a wall thickness that varies over the outside circumference. A very important quality criterion of displacement bearings is that they are without play. Absence of play should be ensured over the entire lifetime of the bearing if possible. Freedom from play can be achieved by "prestressing" the roller bodies with respect to the raceways and/or the inside part. The roller bodies are mounted in the outside part and are themselves virtually inelastic. Therefore the outside part must have a certain radial elasticity at least in the area of the roller bodies. The required elasticity can be achieved through suitable dimensioning of the wall thickness of the outside part in the individual circumferential areas. The wall thickness of the outside part in the wall sections covered by the axes of rotation and the roller bodies is preferably lower than that in the other wall section. Thus the outside part can turn radially to a certain extent in the area of the roller bodies.

The outside part is preferably a cylindrical bearing ring. With this motorcycle fork, this bearing ring is secured in the wheel carrier pipe by pressing, for example. Pressing results in forces acting radially from the outside on the bearing ring. Nevertheless, as explained above, the outside part, i.e., the "bearing ring" must have a certain radial elasticity, at least in the area of the roller bodies. Therefore, a recess is preferably provided on the outside of the outside part in the wall sections of the outside part covered by the axes of rotation and the roller bodies. In the area of the wall sections of the outside part covered by the roller bodies and the axes of rotation, there is thus a certain radial clearance between the outside circumference of the outside part and a component surrounding the outside part, e.g., a wheel pipe carrier into which the outside part is pressed. This clearance permits a certain radial expansion of the outside part.

In addition, it is possible for the wall of the outside part to have a feed-through opening in the central area of the axes of rotation. With such a feed-through opening, it is possible to achieve a weakening of the material of the wall of the outside part and thus to achieve the required elasticity. In addition, a feed-through opening has the advantage that the roller bodies can approach closer to the outside circumference of the outside part. Part of the roller bodies may even protrude into the feed-through opening, i.e., into the wall area of the outside part, which permits a very compact design.

The roller bodies may be supported with friction bearings or roller bearings on the axes of rotation. The displacement bearing may have two or more roller bodies. If two roller bodies are provided, they may be arranged in diametrically opposite positions in the outside part.

In addition, in the central area of the respective axis of rotation, it is possible for the roller bodies to have a "follower element" in their outside circumference. The follower element may be, for example, an elastic plastic ring or gearing. It ensures that the roller bodies will in fact roll on the raceways when there is a relative displacement of the inside part with respect to the outside part. Sliding friction can thus be prevented.

Other objects, advantages and novel features of the present invention will become apparent from the following

BRIEF DESCRIPTION OF THE DRAWINGS

FIG. 3 shows the displacement bearing of FIG. 2 in an end view in the installed state and FIG. 4 shows the outside part of the displacement bearing of FIG. 2 in a perspective diagram.

DETAILED DESCRIPTION

Figure 1:
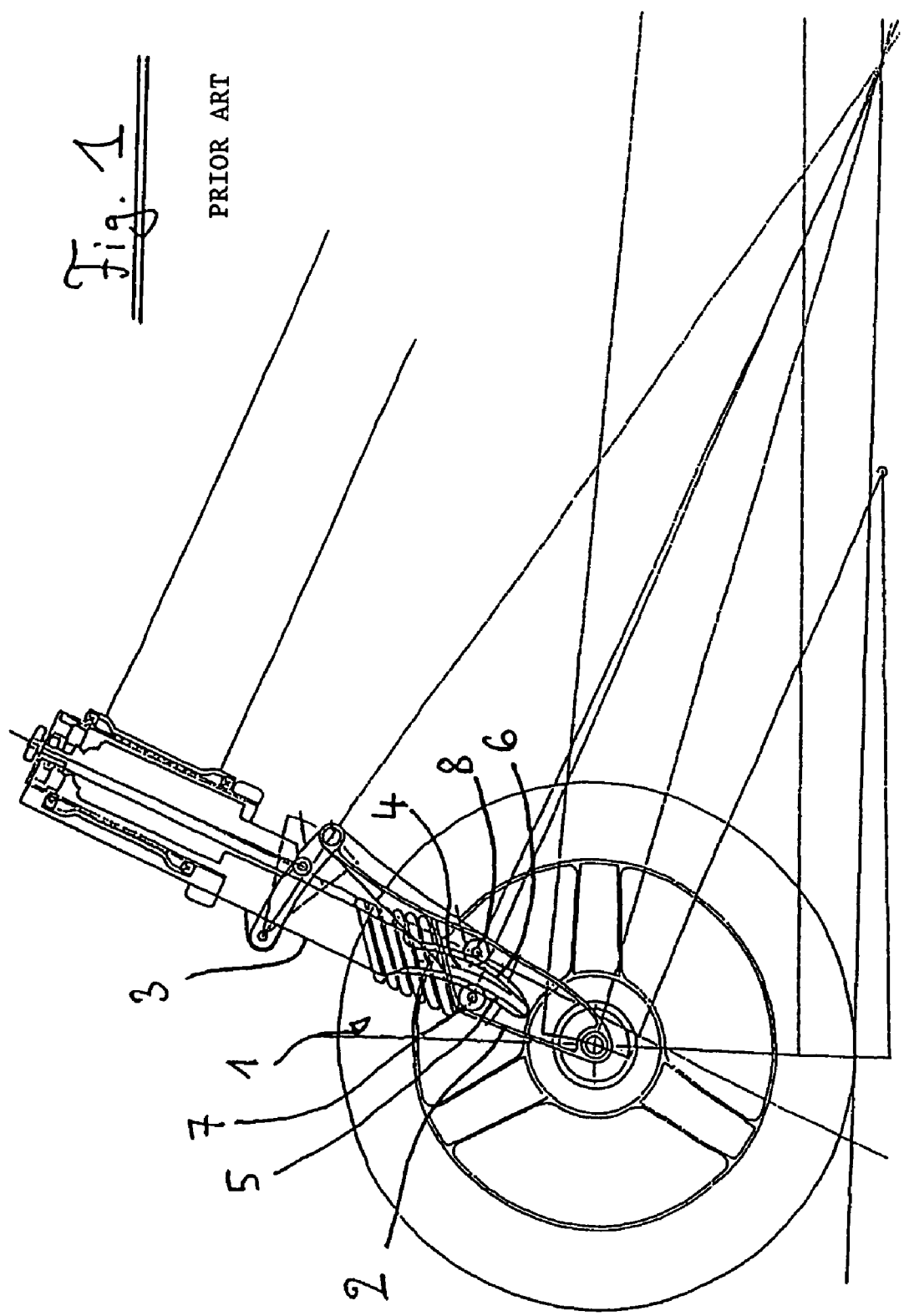
FIG. 1 shows a displacement bearing according to the state of the art as disclosed in DE 199 57 964 A1.

FIG. 1 shows a front wheel suspension of a motorcycle having a displacement bearing 1 according to the state of the art. The front wheel suspension is formed by two forked pipes, only one of which is shown here. Each of the two forked pipes consists of a lower part 2, which is referred to below as the "wheel carrier pipe" and/or as the "outside part," and an upper part 3 on whose lower end is provided a banana-shaped element referred to below as the inside part 4. The inside part 4 has a front raceway 5 and a rear raceway 6. Roller bodies 7, 8 are rotatably mounted in the outside part 2, rolling on the respective raceways when the outside part 2 is displaced in relation to the inside part 4.

Figure 2:
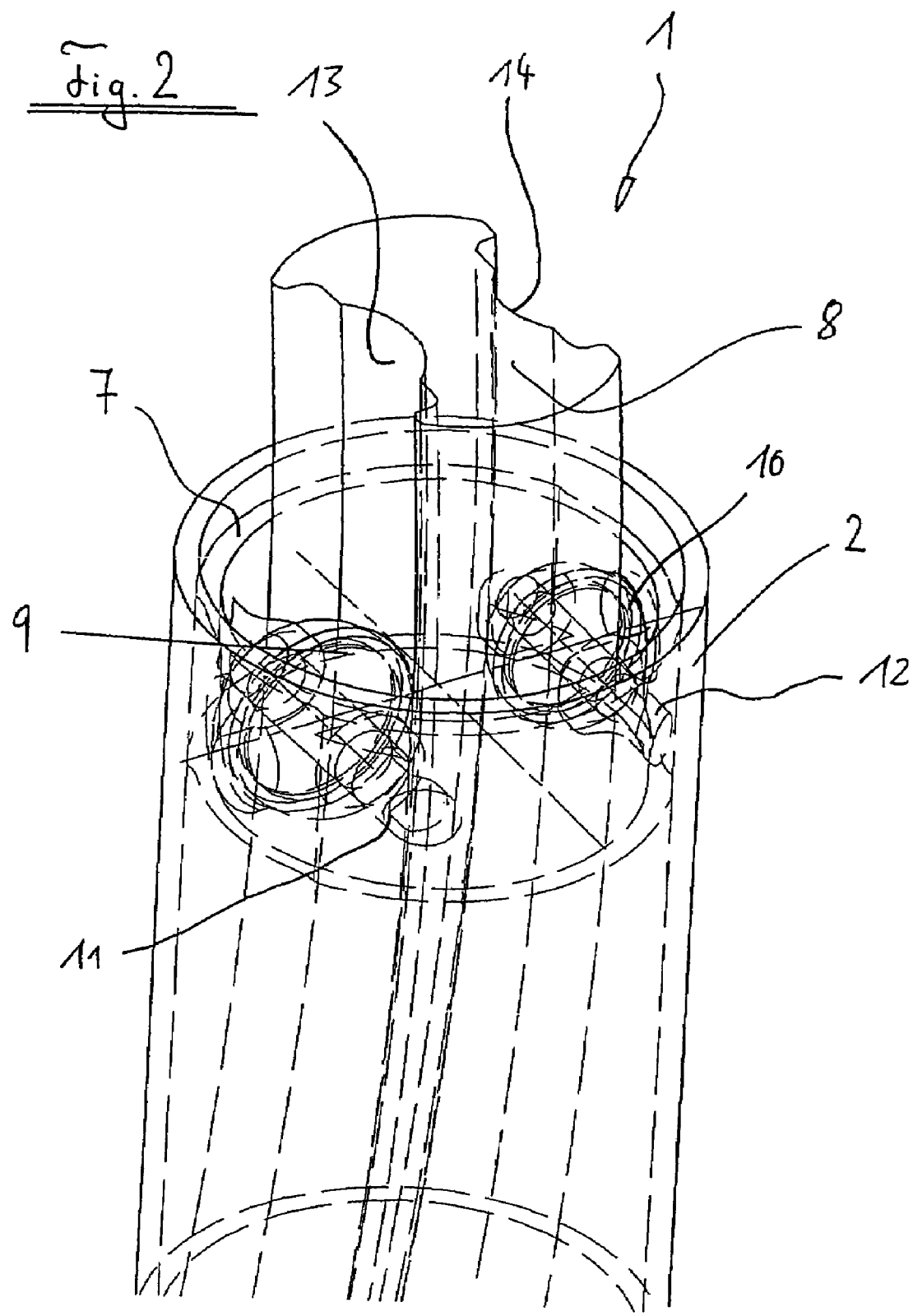
FIG. 2 shows a displacement bearing according to an embodiment of this invention in a three-dimensional diagram.

FIG. 2 shows a displacement bearing 1 according to this invention. The displacement bearing 1 has an outside part 7 arranged in a wheel carrier pipe 2 and an inside part 8 that is displaceable in relation to it. The outside part 7 is formed essentially by a cylindrical ring which is pressed into the wheel carrier pipe. This ring may also be referred to as a bearing cage. The outside part 7 can be secured axially in the wheel carrier pipe by a shoulder (not shown) and on the other side, e.g., by a locking ring (not shown).

Two roller bodies 9, 10 are provided in the interior of the outside part 7. The roller bodies 9, 10 are rotatably mounted, e.g., by roller bearings or friction bearings on the respective axes of rotation 11, 12. The roller bodies may be spherical or ellipsoidal, for example, or they may have some other cambered or convex shape. In the exemplary embodiment depicted in FIGS. 2 through 4, the roller bodies are spherical with "cropped sides." When there is a relative displacement of the outside part 7 with respect to the inside part 8, the roller bodies roll on raceways 13, 14 which have a corresponding concave shape and extend to the outside of the inside part 8 in the direction of displacement. Because of the convex shape of the roller bodies 9, 10 and the concave shape of the raceways 13, 14, the rolling partners are in good mutual contact, which ensures a long lifetime. Another advantage resulting from this is that the displacement bearing 1 can absorb forces acting both perpendicularly as well as across the raceways 13, 14.

The radii of curvature of the roller bodies 9, 10 and the raceways 13, 14 need not be absolutely the same. Instead, the radius of curvature of the raceways 13, 14 may be slightly larger than the radius of curvature of the roller bodies 9, 10. This ensures a defined contact of the roller bodies 9, 10 with the raceways 13, 14.

FIG. 3 shows the displacement bearing 1 in an end view. It can be seen from FIG. 3 that the annular outside part 7 is pressed into a wheel carrier pipe 2. The outside part 7 has a "irregular" wall thickness over its circumference. In the area of the axes of rotation and/or the roller bodies 9, 10, the wall thickness of the outside part 7 is smaller than in the other areas. In the area of the roller bodies 9, 10, a recess 15, 16 is provided on the outside part 7 or, more precisely, on the outside circumference of the outside 7. These recesses 15, 16 achieve a controlled weakening of the material of the outside part 7 in the area of the roller bodies 9, 10. To ensure that they are without play, the roller bodies are under radial prestress with respect to the inside part and/or the raceways of the inside part 8, i.e., the inside part 8 has a certain excess dimension. To "equalize" this excess dimension, the outside part 7 in the installed state is widened radially somewhat in the area of the recesses 15, 16 and thus remains permanently elastic.

FIG. 3 also shows that the roller bodies 9, 10 each have a "follower" element 17, 18 in their central area. The follower elements may be elastic plastic rings, for example. As an alternative to that, the follower elements may also be formed by gearing which meshes with a correspondingly designed mating gearing in the part 8. The follower elements ensure in general that with a relative displacement of the outside part 7 with respect to the inside part 8, the roller bodies 9, 10 roll and do not slide on the raceways of the inside part 8.

In addition, "supporting ribs" may be provided in the recesses 15, 16. The supporting ribs may be provided on the outside of the outside part 7, for example. As an alternative to that, they may also be arranged on the inside of the wheel carrier pipe 2. A precision adjustment of the radial elasticity of the outside part is possible with such supported ribs.

FIG. 4 shows the outside part 7 in a perspective diagram. This shows clearly that the outside part 7 is designed as a ring-shaped bearing cage having bores 20 into which are pressed the axes of rotation 11, 12 and on which the roller bodies 9, 10 are rotatably mounted. In the area of the recesses 15, 16, a feed-through opening 21, 22 is provided in the wall of the bearing cage. The rigidity of the outside part 7, i.e., the bearing cage is weakened in a targeted manner by the feed-through openings. In addition, this yields the advantage that the roller bodies 9, 10 may be arranged even farther toward the wall of the bearing cage, i.e., the roller bodies 9, 10 may even protrude into the area of the wall of the bearing cage 19, which permits a very compact design.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Displacement bearing for motorcycle forks, having
an inside part which has raceways on an outside surface extending in a direction of fork displacement,
an outside part which extends around the inside part and is displaceable in relation to the inside part,
at least two roller bodies, which are arranged in an interior of the outside part and which are each rotatably mounted on an axle transverse to a longitudinal axis of the outer part so as to rotate about respective axes of rotation in the interior of the outside part, with the roller bodies rolling on the raceways with a displacement of the inside part in the outside part, wherein
the roller bodies have a convex shape and each raceway has a concave shape, for transfer of forces between the inside part and the outside part acting perpendicularly and/or transversely to the raceways.

2. Displacement bearing as claimed in claim 1, wherein the axes of rotation each bridge an arc-shaped wall segment of the outside part, with respective ends of the axes of rotation each being held on the interior of the outside part.

3. Displacement bearing as claimed in claim 1, wherein the outside part is essentially cylindrical and has wall sections of different thickness.

4. Displacement bearing as claimed in claim 1, wherein a wall thickness of the outside part is smaller, in at least a part of wall sections spanned by and radially outward from the axes of rotation, than in other wall sections of the outside part.

5. Displacement bearing as claimed in claim 4, wherein the smaller wall thickness in the wall sections spanned by and radially outward from the axes of rotation is implemented by a recess provided on an outside circumference of the outside part.

6. Displacement bearing as claimed in claim 1, wherein a wall of the outside part has a feed-through opening substantially centered between respective ends of each of the axes of rotation such that the respective roller bodies are permitted to protrude into these feed-through openings.

7. Displacement bearing as claimed in claim 1, wherein the roller bodies are slidingly mounted on the axes of rotation.

8. Displacement bearing as claimed in claim 1, wherein the roller bodies are mounted on the axes of rotation so they can roll.

9. Displacement bearing as claimed in claim 1, wherein exactly two roller bodies are provided and arranged in diametric opposition in the outside part.

10. Displacement bearing as claimed in claim 1, wherein each roller body has a follower element on an outside circumference in a plane transverse to each roller body's axis of rotation such that the follower element contacts the raceways and the roller bodies will roll on the raceways when there is a relative displacement of the inside part with respect to the outside part.

11. Displacement bearing as claimed in claim 10, wherein the follower element is an elastic ring.

12. Displacement bearing as claimed in claim 10, wherein the follower element is formed by gearing which meshes with a respective mating gearing on the inside part.

13. Motorcycle fork having two fork pipes, each having a displacement bearing as claimed in claim 1.

14. Motorcycle fork as claimed in claim 13, wherein the two fork pipes each have a wheel carrier pipe segment for receiving a front wheel between the wheel carrier pipe segments, and an upper fork pipe segment which is displaceable in the wheel carrier pipe segments, whereby the outside parts are pressed into the wheel carrier pipe segments and the inside parts are formed by the lower ends of the upper fork pipe segments.

* * * * *